United States Patent [19]
Kido et al.

[11] Patent Number: 5,561,724
[45] Date of Patent: Oct. 1, 1996

[54] METHOD CONDUCTING SMOOTHING PROCESSING IN A LINEAR DIRECTION HAVING A MINIMIZED MAGNITUDE OF DENSITY CHANGE

[75] Inventors: Kunihiko Kido; Koichi Sano, both of Yokohama; Jun'ichi Taguchi, Sagamihara, all of Japan

[73] Assignee: Hitachi Medical Corporation, Tokyo, Japan

[21] Appl. No.: 258,382

[22] Filed: Jun. 10, 1994

[30] Foreign Application Priority Data

Jun. 11, 1993 [JP] Japan .................................. 5-140334

[51] Int. Cl.$^6$ ................................................ G06K 9/44
[52] U.S. Cl. ............................................ 382/264; 382/275
[58] Field of Search ..................................... 382/254, 260, 382/264, 266, 275; 358/447, 463; 364/724.01; 348/607; H04N 1/409

[56] References Cited

U.S. PATENT DOCUMENTS 5,390,264  2/1995  Ishihara et al. ............................ 382/54
5,408,338  4/1995  Koike ........................................ 358/448

FOREIGN PATENT DOCUMENTS 4-188283  7/1992  Japan .............................. G06F 15/68

OTHER PUBLICATIONS

Harashima et al., "E–Separating Nonlinear Digital Filter and Its Applications," *Trans. of the Inst of Electr. and Comm. Engs. of Japan*, vol. J65–A, No. 4, Apr. 1982, pp. 297–304.

Perona et al., "Scale–Space and Edge Detection Using Anistropic Diffusion," *IEEE Trans. on Pattern Analysis and Machine Intell.*, vol. 12, No. 7, Jul. 1990, pp. 629–639.

Lee, "Digital Image Enhancement and Noise Filtering by Use of Local Statistics,"*IEEE Trans. on Pattern Analysis and Machine Intell* ; vol. PAMI–2, No. 2, Mar. 1980, pp. 165–168.

Toriwaki, "Digital Image Processing for Image Understanding," Shoko–do, Nov. 30, 1989, pp. 112–114.

Mallat, "A Theory for Multiresolution Signal Decomposition: The Wavelet Representation," *IEEE Trans. on Pattern Analysis and Machine Intell.*, vol. 11, No. 7, Jul. 1989, pp. 674–693.

Daubechies, "Orthonormal Bases of Compactly Supported Wavelets," *Commun. Pure Appl. Math.*, vol. XLI, Nov. 1988, pp. 909–996.

English Translation of Japanese Kokai 4–188283, Mita, Jul. 1992.

*Primary Examiner*—Leo Boudreau
*Assistant Examiner*—Andrew W. Johns
*Attorney, Agent, or Firm*—Antonelli, Terry, Stout & Kraus

[57] ABSTRACT

A noise filtering method including the steps of calculating a magnitude $E_i$ of density change for each of a plurality of linear direction components i in a local region around each of pixels of an inputted two-dimensional image, detecting such a direction as to minimize the magnitude $E_i$ of density change, conducting smoothing processing by deriving an arithmetic mean of densities of pixels in the local region arranged in the detected direction, and thereby reducing noise of the inputted image.

20 Claims, 11 Drawing Sheets

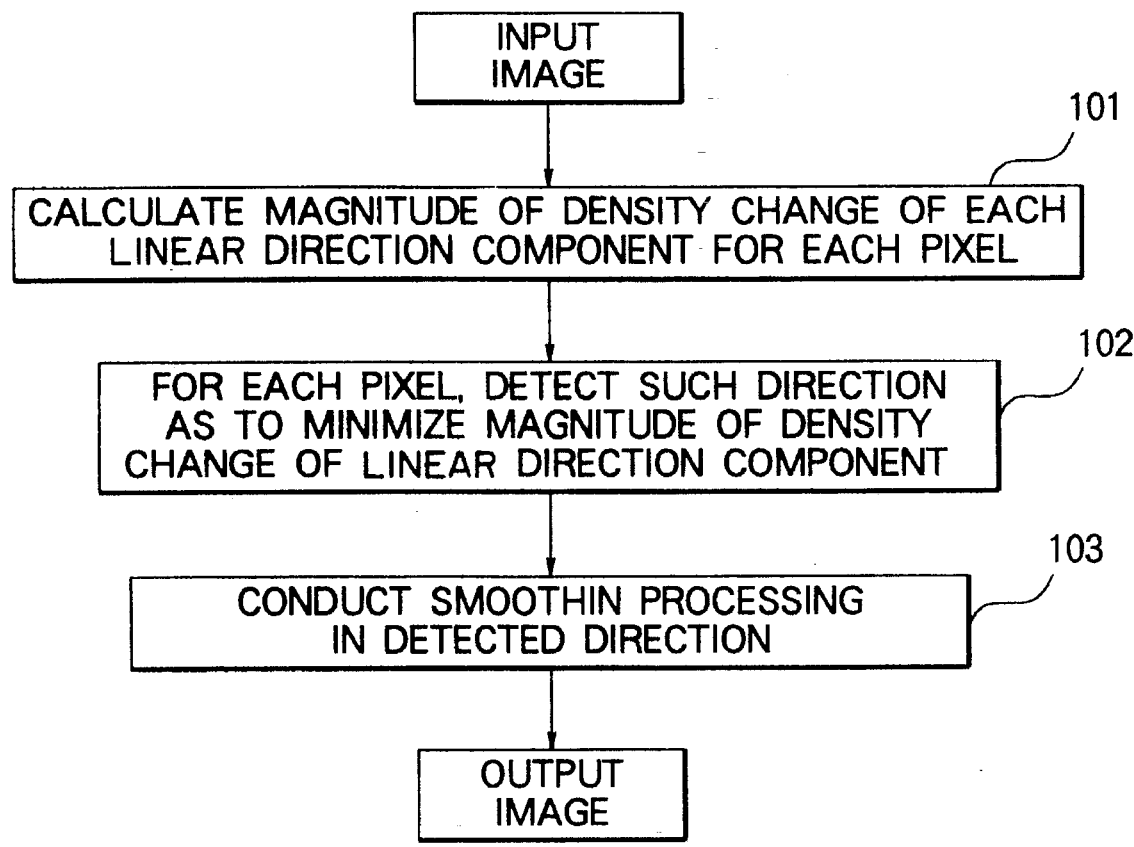
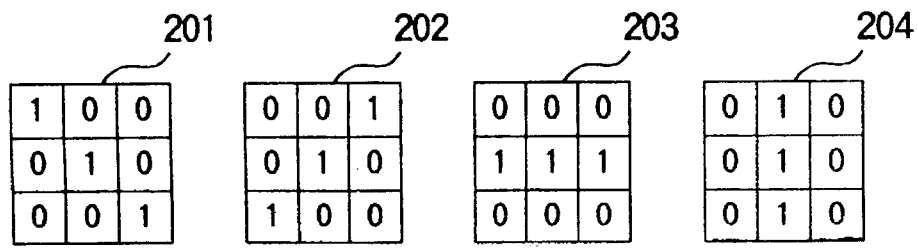

FIG. 3

| 0.5 | 0 | 0 |
|---|---|---|
| 0 | 1 | 0 |
| 0 | 0 | 0.5 |

| 0 | 0 | 0.5 |
|---|---|---|
| 0 | 1 | 0 |
| 0.5 | 0 | 0 |

| 0 | 0 | 0 |
|---|---|---|
| 0.5 | 1 | 0.5 |
| 0 | 0 | 0 |

| 0 | 0.5 | 0 |
|---|---|---|
| 0 | 1 | 0 |
| 0 | 0.5 | 0 |

LOCAL DIRECTIONALITY IS NOT PRESENT

LOCAL DIRECTIONALITY IS PRESENT

FIG. 14

| A2f | D2,2f | D2,1f |
| D1,2f | D3,2f | |
| D1,1f | | D3,1f |

METHOD CONDUCTING SMOOTHING PROCESSING IN A LINEAR DIRECTION HAVING A MINIMIZED MAGNITUDE OF DENSITY CHANGE

BACKGROUND OF THE INVENTION

The present invention relates to noise reduction processing in the field of image processing and in particular to a filter for reducing noise without causing image blurring or density unevenness.

Since noise reduction processing basically functions to smooth a rapid change of density, it has an effect of blurring outlines of figures. Therefore, there is noise reduction processing called edge preserving smoothing, in which outlines of figures are roughly estimated by using some method, and smoothing is conducted so as not to hamper them. Representative papers describing such noise reduction processing are as follows:

(1) H. Harashima, K. Odajima, Y. Shishikui and H. Miyakawa, "ε-Separaing Nonlinear Digital Filter and Its Applications", The Trans. of The Institute of Electronics and Communication Engineers of Japan [A]), Vol. J65-A, No. 4, pp. 297–304 (April 1982);

(2) P. Perona and J. Malik, "Scale-Space and Edge Detection Using Anisotoropic Diffusion", IEEE Trans. on Pattern Analysis and Machine Intelligence, Vol. 12, No. 7, July 1990, pp. 629–639; and (3) J-S. Lee, "Digital Image Enhancement and Noise Filtering by Use of Local Satistics", IEEE Trans. on Pattern Analysis and Machine Intelligence, Vol. PAMI-2, No. 2, March 1980, pp. 165–168.

According to methods described in these papers, a degree of edge structure is defined in a local region according to the differential value or local variance value, and the effect of smoothing is adjusted according to the degree of its edge structure. A local structure is recognized on the basis of whether it is an edge, and its directionality is not considered. This results in a problem that enhancing the noise reducing effect with respect to an image having a poor signal-to-noise ratio tends to cause blurring in edges or density unevenness.

Furthermore, in JP-A-4-188283, a technique for detecting edges of binary images, smoothing edges, and reconstructing multi-valued images is described. In this technique, the direction of the edge is detected, and out of a plurality of smoothing filters used for smoothing regions differing in shape of spatial region and distribution of coefficient, one filter is selected according to the direction of the edge to reduce blurring of figures on images.

On the other hand, as an exemplary the method for performing smoothing by taking the local structure of the image into consideration, there is a method using local template matching. This method is described in "Digital Image Processing For Understanding Image [I]", written by Junichiro Toriwaki and published by Shokodo on Nov. 30, 1989, pp. 112–114. This method includes preparing typical patterns of density curved surfaces in local regions of images in the form of templates, making a match between an input density value at $U((i, j))$ in a neighborhood of each pixel $(i, j)$ of the image and a template so as to select a template suited to the local structure of the neighborhood $U((i,j))$, and conducting smoothing processing. Specifically, first of all, some samples of partial image (templates) are prepared beforehand. On the other hand, arrangement of input density values at $U((i, j))$ in the neighborhood of the pixel $(i, j)$ in a predetermined order is regarded as a One-dimensional vector and represented as $F_{ij}$. Templates are also arranged in a similar order to form a one-dimensional vector and represented as $A_1, A_2, \ldots, A_m$. At this time, with respect to a function S representing the degree of conformity of each template in $(i, j)$, $$k_0 = \min S(F_{ij}, A_k)$$

is calculated. By using a template $Ak0$ as a weighting function, smoothing processing is conducted on the basis of pixel values included in $U((i, j))$ of the pixel $(i, j)$. As for the concrete form of the function S representing the degree of conformity, a wide variety of forms have been contrived in the field of numerical classification in pattern recognition and statistics.

SUMMARY OF THE INVENTION

In general, in an image having a complicated structure, it becomes difficult to accurately select a pattern conforming to a local structure on the basis of a simple function representing the degree of conformity as templates are classified finely. At this time, errors of pattern detection appear as density unevenness of the image or blurring of edges. Furthermore, if patterns are classified too finely, a pattern conforming to a spurious structure caused by noise may be present. That is to say if patterns are classified too finely, it becomes difficult to define a function representing the degree of pattern conformity which is stable under the presence of noise and the noise reducing effect is weakened. Furthermore, there also occurs a problem that it takes search time for searching for a conforming pattern.

An object of the present invention is to provide an image noise filtering method capable of preventing occurrence of density unevenness of the image and blurring of edges and in addition sufficiently reducing noise.

Another object of the present invention is to provide a noise filtering method which allows high-speed image filtering processing and which is suitable for real time image processing.

In accordance with a feature of the present invention, for each pixel of an original image, density changes of a local region around the pixel along a plurality of directions are compared to detect such a direction as to minimize the density change and smoothing processing is conducted only in the detected direction. That is to say, attention is paid to only the direction of an equidensity line in the local structure of each pixel, according to the present invention. Therefore, the function representing the degree of conformity of a pattern can be defined clearly. For example, the sum of absolute values of density differences between adjacent pixels may be calculated, and such a direction as to minimize the sum may be selected. At this time, only detection of the linear direction component of a local structure is made. Therefore, failures of pattern detection caused by noise are reduced. At the same time, even if a failure is made in detection, blurring is hardly caused in the image, because the smoothing processing is one-dimensional. In conventional local template matching, a bent line included in a classified pattern often causes false recognition of ruggedness of a boundary line due to noise as a true boundary line in edges of the image, for example. In some cases, this ruggedness remains after smoothing. If patterns are limited to straight lines as in the present invention, however, then boundary lines of edges are fitted to straight lines and unevenness due to noise is suppressed, resulting in clear edges. Furthermore, since templates are limited to straight lines, the time required for searching conforming patterns is shortened.

BRIEF DESCRIPTION OF THE DRAWINGS

FIG. 1 is a flow chart showing the processing procedure of a first embodiment of the present invention;

FIG. 2 is a diagram showing an example of a template of an equidensity line in the embodiment;

FIG. 3 is a diagram showing examples of a filter coefficient distribution of smoothing processing in the embodiment 1;

FIG. 14 is a diagram showing wavelet representation using subband coding.

DESCRIPTION OF THE PREFERRED EMBODIMENTS

[Embodiment 1]

Figure 4:
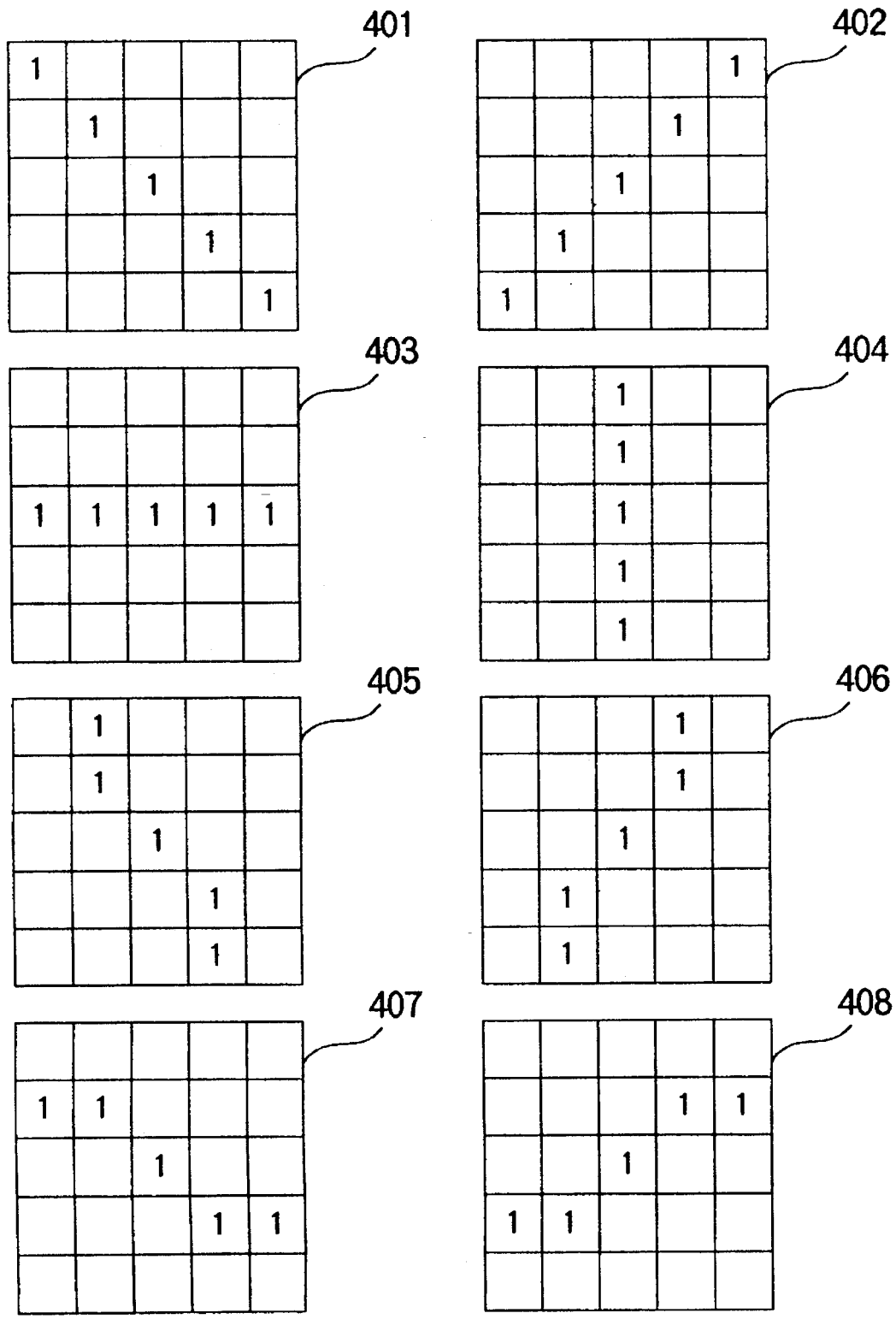
FIG. 4 is a diagram showing another example of the template of the equidensity line in the embodiment 1.

A first embodiment of the present invention will now be described by referring to FIG. 1. In FIG. 1, an input image I(i, j) is a grey level image having a suitable number of (256, for example) scales such as a medical image like an MRI image or a CT image, a satellite image, or a photograph. Furthermore, in a color image as well, filtering processing described below by referring to FIG. 1 may be applied to each of R, G and B images. In the first embodiment, a direction of an equidensity line is derived for each pixel of the input image I by using a local region having a matrix size of 3*3 as shown in FIG. 2 around the noticed pixel. That is to say, templates of equidensity lines of four kinds denoted by 201, 202, 203 and 204 in FIG. 2 are prepared, and it is detected which template is in best conformity with the equidensity line of the local region. That is to say, the linear direction component of the equidensity line is limited to four directions located at intervals of 45 degrees. As the index indicating the degree of conformity of templates of equidensity lines of four kinds, the sum of absolute values of density differences between adjacent pixels for three pixels included in the 3*3 matrix located on a template line is employed. It will now be described concretely.

First of all, for each pixel (i, j) of the input image I, absolute values of density differences between that pixel and eight points adjacent thereto are calculated, respectively. This can be represented by an expression as follows:

$$\Delta_{k,l}(i,j)=|I(i+k,j+1)-I(i,j)|(k,l=-1\sim1) \quad (1)$$

Then, the sum of absolute values of density differences is calculated along each of template lines of equidensity lines of four kinds. It is represented by the following expression.

$$d4(1)=\Delta_{-1,-1}(i,j)+\Delta_{1,1}(i,j)$$

$$d4(2)=\Delta_{-1,1}(i,j)+\Delta_{1,-1}(i,j)$$

$$d4(3)=\Delta_{-1,0}(i,j)+\Delta_{1,0}(i,j)$$

$$d4(4)=\Delta_{0,-1}(i,j)+\Delta_{0,1}(i,j) \quad (2)$$

In this expression, d4(k) (k=1 to 4) correspond to the degrees of conformity of the templates 201, 202, 203 and 204, respectively. A template having a minimum value of d4(k) is in best conformity with the local structure.

Referring back to FIG. 1, the entire procedure of filtering processing of the first embodiment will now be described. First of all, at step 101, processing of the above described expressions (1) and (2) is conducted and thus the magnitude d4(k) (k=1 to 4) of density change of the linear direction component is calculated for each pixel (i, j) of the input image I. Then at step 102, such a direction that the magnitude d4(k) (k=1 to 4) of density change of the linear direction component is minimized is determined for each pixel (i, j). At step 103, three-point simple average O(i, j) of density values is calculated for each pixel (i, j) by using a template conforming to the direction detected at step 102 as a weighting function. Then at step 104, the average O is outputted as a filter-processed image. That is to say, in the present embodiment, density changes of a local region centering around a noticed pixel along straight lines of four directions are compared to detect a direction minimizing the density change and smoothing processing is conducted only in the detected direction.

In the smoothing processing at step 103, a simple average is calculated by using the template itself of the selected equidensity line. In order to prevent blurring of the processed image, however, weighted templates for smoothing as shown in FIG. 3 may be prepared apart from the templates of equidensity lines of FIG. 2 and a weighted average may be calculated. Furthermore, in the embodiment 1, the matrix size is 3*3. When the effect of smoothing is desired to be enhanced, however, the matrix size may be made larger. For example, templates of equidensity lines of the case where the matrix size is decided to 5*5 are shown in FIG. 4. In case the matrix size of a local region is thus decided to be 5*5, eight kinds of templates can be prepared, i.e., the number of detection directions of the linear direction component can be decided to be eight. However, patterns 405, 406, 407 and 408 of four directions among eight directions are bent lines and they are not the linear direction components in strict sense. In many cases, however, there is no harm even if the linear direction components of equidensity lines are approximated by such bent lines in actual image data. In case it is desired to calculate the linear direction component strictly, it can be derived from adjacent pixels by interpolation calculation. Furthermore, the magnitude d8(k) (k=1 to 8) of density change in case the matrix size is decided to be 5*5 can be calculated as the sum of absolute values of density differences between adjacent pixels located on lines of respective directions (k=1 to 8) in the same way as the case of 3*3.

[Embodiment 2]

Figure 5:
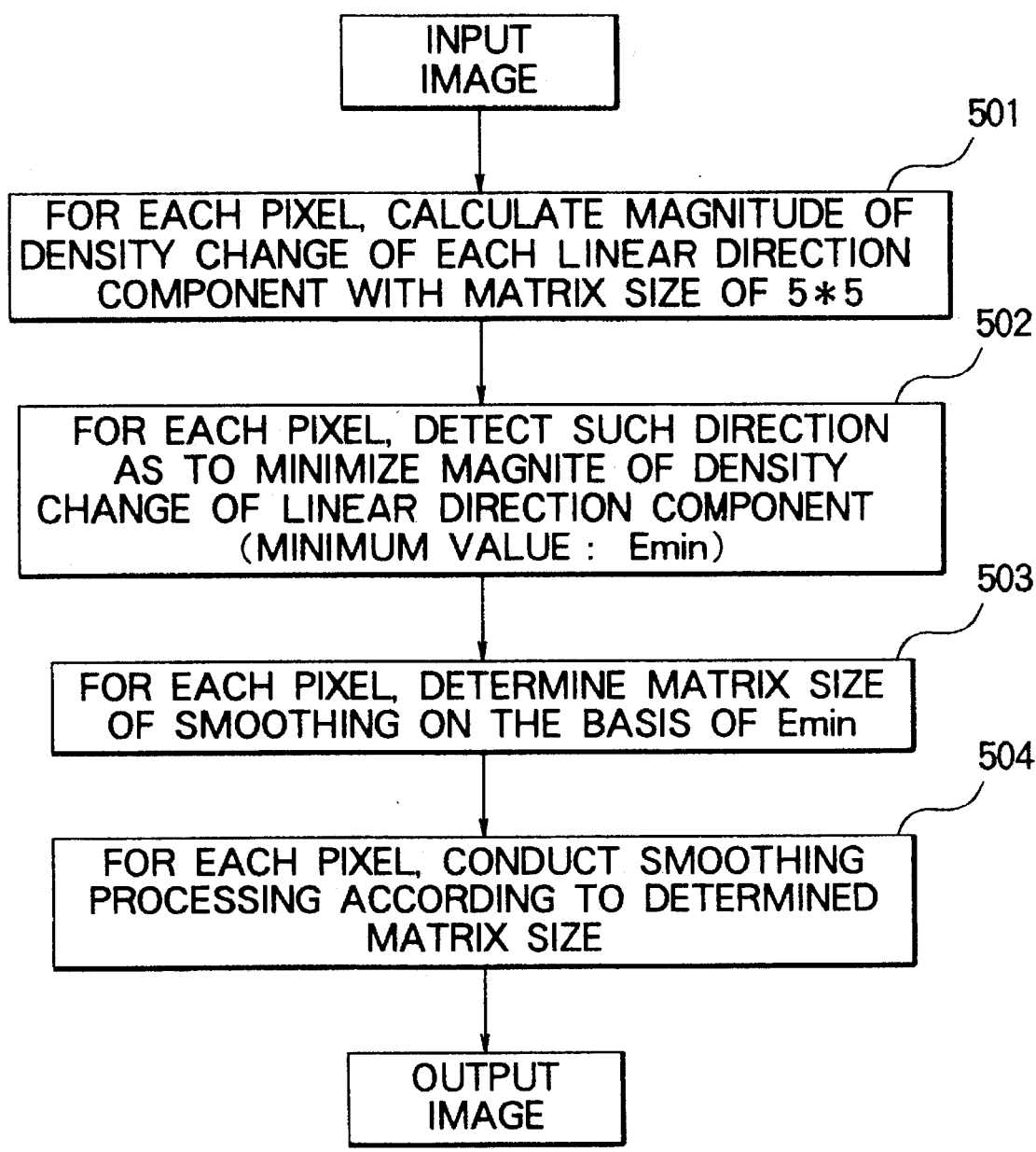
FIG. 5 is a flow chart showing the processing procedure of another embodiment of the present invention.

A second will now be described by referring to FIG. 5. If in the first embodiment the matrix size is expanded to 5*5 in order to enhance the effect of smoothing, a structure having no directionality, such as a hole or a sharp point, is blurred. In the second embodiment, therefore, the range subjected to smoothing processing is changed according to the local structure associated with every pixel in order to keep such a structure from blurring. For example, in a region akin to a flat structure, the matrix size for smoothing is made larger to enhance the effect of smoothing, whereas in a region having a non-flat structure, the matrix size for smoothing is made smaller to suppress blurring of the structure having no directionality. As the means for determining whether there is a structure, the minimum value $E_{min}$ of the magnitude $E_i$ of density change of each linear direction component i is employed. When $E_{min}$ has a small value, the region is regarded as a region akin to a flat face. When $E_{min}$ has a large value, the region is regarded as a region having a structure on the linear direction component thereof. Furthermore, the matrix size for detecting the linear direction component of an equidensity line is decided to be 5*5. According to the value of the minimum $E_{min}$ of the magnitude $E_i$ of density change, the matrix size for smoothing is adjusted to become 5*5 to 1*1.

By referring to FIG. 5, the entire procedure of filtering processing of the second embodiment will now be described.

[Step 501] For each pixel (i, j) of the input image I, the magnitude d8(k) (k=1 to 8) of density change of the linear direction component is calculated.

[Step 502] For each pixel (i, j), such a direction as to minimize the magnitude d8(k) (k=1 to 8) of density change of the linear direction component is decided.

[Step 503] For each pixel (i, j), the matrix size for smoothing is determined on the basis of the magnitude $E_{min}$ of density change in the direction detected at step 502 and threshold values E2>E1 as follows:

| | |
|---|---|
| (1) size of 5*5 | when $E1 > E_{min}$; |
| (2) size of 3*3 | when $E2 \geq E_{min} \geq E1$; |
| (3) size of 1*1 (pixel value) | when $E_{min} > E2$. |

[Step 504] For each pixel (i, j), the simple average value O(i, j) is calculated on the basis of the matrix size for smoothing determined at step 503 and the direction determined at step 502 as described below.

(1) When the smoothing range is 5*5: A five-point simple average O(i, j) is calculated by using a template conforming to the detected direction as a weighting function.

(2) When the smoothing range is 3*3: A three-point simple average O(i, j) is calculated by using the pattern 201 of FIG. 2 as the smoothing template when the detected direction is pattern 401, 405 or 407, by using the pattern 202 of FIG. 2 as the smoothing template when the detected direction is pattern 402, 406 or 408, by using the pattern 203 of FIG. 2 as the smoothing template when the detected direction is pattern 403, and by using the pattern 204 of FIG. 2 as the smoothing template when the detected direction is pattern 404.

(3) When the smoothing range is 1*1: The density value of the noticed pixel I(i, j) is used as the value of O(i, j) as it is.

Finally, the filter-processed image, 0 is outputted.

In filtering according to the above described procedure, noise is sufficiently reduced over the entire image and occurrence of blurring of a structure having no directionality, such as a hole or a sharp point, can be suppressed. Furthermore, such a modification as to enhance the noise reducing effect is also possible. When $E_{min}$ is sufficiently small (approximately noise level), for example, it is considered that there is no structure at all except the noise amplitude in the neighbor of the pixel. With regard to this pixel (i, j), plane smoothing (two-dimensional smoothing) is conducted. To be concrete, when the value of $E_{min}$ is smaller than a threshold E0 (where E0< E1) at steps 503 and 504, a nine-point or 25-point simple average value may be derived by using all pixels having a matrix size of 3*3 or 5*5 around that pixel and the result may be used as O(i, j). Instead of the simple average, a weighted average may be used.

[Embodiment 3]

Figure 6:
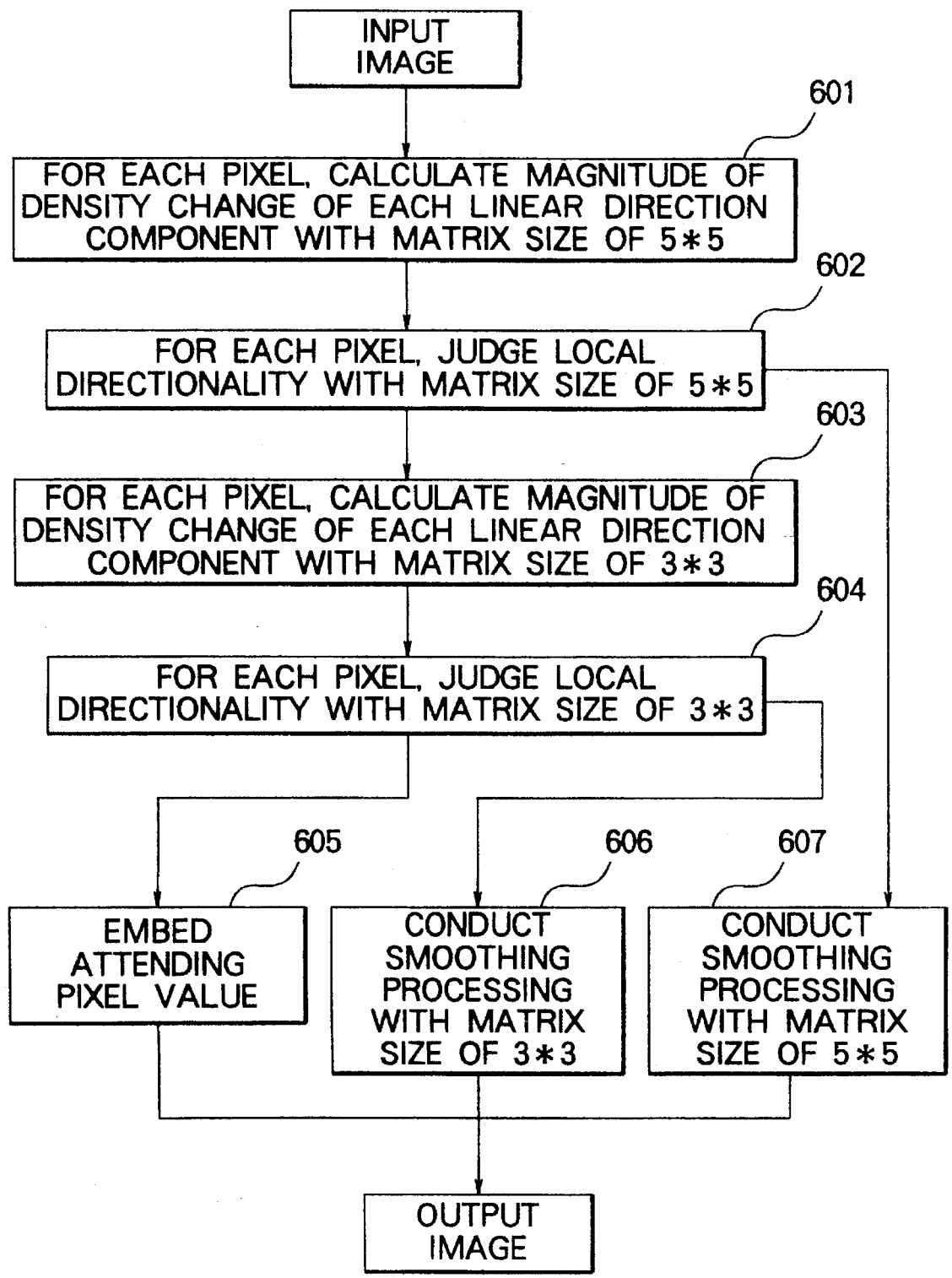
FIG. 6 is a flow chart showing the processing procedure of still another embodiment of the present invention.

Third embodiment 3 will now be described by referring to FIG. 6. In the second embodiment, direction detection is performed by using the 5*5 matrix and thereafter the matrix size for smoothing is changed according to the strength of directionality, and smoothing processing is conducted in the present embodiment, such a matrix size that the linear directionality of the equidensity line appears clearly in the local structure of each pixel is,detected, one direction of the equidensity line is detected in the matrix having the size, and smoothing processing is conducted.

[Step 601] For each pixel (i, j) of the input image I, the magnitude d8(k) (k=1 to 8) of density change of the linear direction component is calculated with the matrix size of 5*5.

[Step 602] For each pixel (i, j), processing proceeds to a decision routine for a local structural nature which will be described later and it is determined whether there is linear directionality with a matrix size of 5*5. If there is no directionality, processing proceeds to step 603. If there is directionality, processing proceeds to step 607.

[Step 603] For the noticed pixel (i, j), the magnitude d4(k) (k=1 to 4) of density change of the linear direction component is calculated with the matrix size of 3*3.

[Step 604] For the noticed pixel (i, j), processing proceeds to the decision routine for a local structural nature which will be described later and it is determined whether there is linear directionality with a matrix size of 3*3. If there is no directionality, processing proceeds to step 605. If there is directionality, processing proceeds to step 606.

[Step 605] Since linear directionality cannot be detected even with the matrix size of 3*3, the density I(i, j) itself of the noticed pixel (i, j) is used as the output O(i, j) obtained after filtering. That is to say, the following expression is obtained.

$$O(i, j) = I(i, j) \qquad (3)$$

[Step 606] For the noticed pixel (i, j), a template having a size of 3*3 corresponding to such a direction as to minimize the magnitude d4(k) (k=1 to 4) of density change of the linear direction component is selected as the weighting function, and the three-point simple average value is used as O(i, j).

[Step 607] For the noticed pixel (i, j), a template having a size of 5*5 corresponding to such a direction as to minimize the magnitude d8(k) (k=1 to 8) of density change of the linear direction component is selected as the weighting function, and the five-point simple average value is used as O(i, j).

By carrying out the procedure heretofore described every pixel of the input, the direction of the equidensity line in each pixel position can be detected properly. By conducting smoothing processing only in that direction, an output image having less blurring and noise sufficiently reduced is obtained. Furthermore, since smoothing processing is conducted according to the property of the image near each pixel, blurring of holes and sharp points can be made small.

Several examples of the decision routine for local structural nature carried out at steps 602 and 604 of the present embodiment will now be described.

Figure 7:
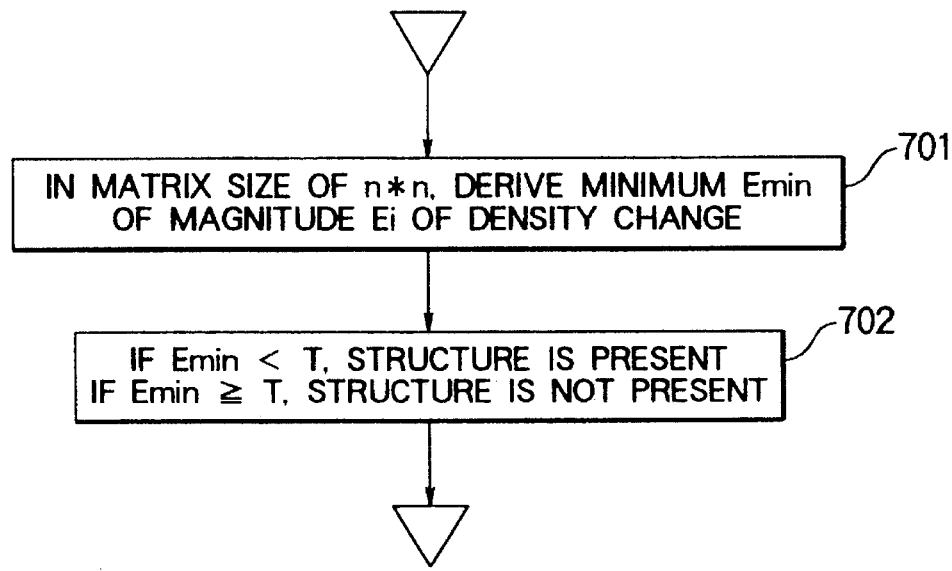
FIG. 7 is a flow chart showing the processing procedure of a decision routine for local directionality in the embodiment of FIG. 6.

First of all, since the linear directionality is considered as To the local structure of the image in the present invention, presence/absence of structure in a local region and presence/absence of directionality in that region have the same meaning. As the means for determining whether there is a structure, the minimum value. $E_{min}$ of the magnitude $E_i$ of density change of each primary direction component i is employed. When $E_{min}$ has a small value, the region is regarded as a region akin to a flat face. When $E_{min}$ has a large value, the region is regarded as a region having a structure on that direction. This method will now be described by referring to FIG. 7.

[Step 701] In a matrix size of n*n, a minimum value $E_{min}$ is derived for the magnitude $E_i$ of density change of each linear direction component i=1 to m.

[Step 702] With respect to a predetermined threshold T, a structure is judged to be present if $E_{min}<T$, and a structure is judged to be not present if $E_{min} \geq T$.

Figure 8A:
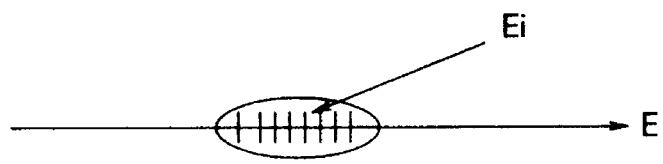
FIGS. 8A and 8B are concept diagrams showing distribution of the density change value in each direction according to whether there is local directionality.
Figure 8B:
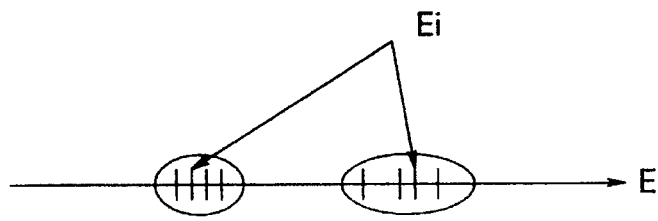

As another method concerning decision as to whether a structural nature (directionality) is present, there is a method described below. It is now assumed in the matrix of n*n that the magnitude of density change of each linear direction component is $E_i$ (i=1 to m). FIGS. 8A and 8B show $E_i$ (i=1 to m) arranged on a numerical straight line. If there is no directionality in an n*n region around a noticed pixel, comparison of magnitude values $E_i$ (i=1 to m) of density change of linear direction components do not produce significant changes and $E_i$ (i=1 to m) form one cluster on the numerical straight line as shown in FIG. 8A. When there is directionality in the n*n region of the noticed pixel, however, at least two clusters, i.e., a direction of smaller density changes and a direction of larger density changes, are formed as shown in FIG. 8B. As the directionality becomes clear, the distance between the two clusters becomes large. By utilizing such a property, directionality can be detected according to the procedure shown in FIG. 9.

[Step 901] In the matrix size of n*n, the maximum $E_{max}$ and the minimum $E_{min}$ of the magnitude $E_i$ of density change of primary direction components i=1 to m are derived.

[Step 902] With respect to $D=E_{max}-E_{min}$,
it is determined that directionality is present if D>T; and
it is determined that directionality is not present if $D \leq T$.

Figure 9:
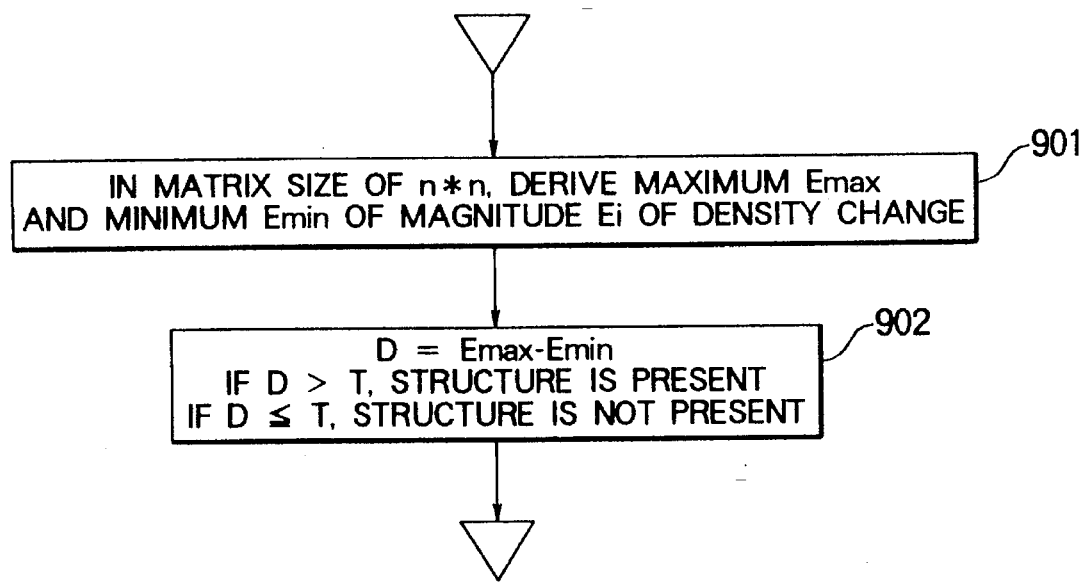
FIG. 9 is a flow chart showing another example of the processing procedure of the decision routine for local directionality in the embodiment of FIG. 6.
Figure 10:
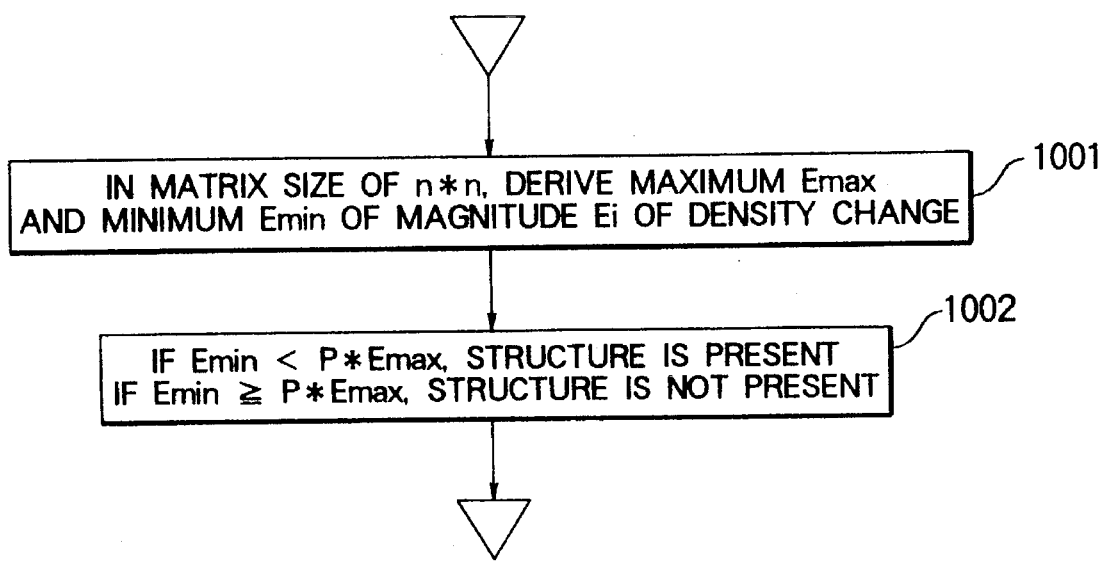
FIG. 10 is a flow chart showing still another example of the processing procedure of the decision routine for local directionality in the embodiment of FIG. 6.

An example of further modification of the decision routine for local structural nature shown in FIGS. 8A, 8B and 9 and described heretofore is shown in FIG. 10. If a structure having a large density value is blurred by smoothing processing, it is extremely prominent. In a pixel having a large density value and a matrix having a large size, it should be determined in some cases that directionality is not present except the case where there is clearly directionality. In this way, decision for the local structure according to the density value of the noticed pixel is made in the example of FIG. 10. Hereafter, description will be given by referring to FIG. 10.

[Step 1001] With respect to the magnitude $E_i$ of density change of linear direction components i=1 to n, the maximum $E_{max}$ and the minimum $E_{min}$ are derived.

[Step 1002]
It is determined that directionality is present if $E_{min}<0.4 * E_{max}$; and
it is determined that directionality is not present if $E_{min} \geq 0.4 * E_{max}$.

In this processing, the value of $E_{max}$ exerts influence upon decision of directionality. That is to say, as the density value becomes higher, the width between $E_{max}$ and $0.4 * E_{max}$ becomes wider and the relation $E_{min} < 0.4 * E_{max}$ does not tend to hold true. Even if the magnitude of density change of linear direction components fluctuates somewhat, therefore, the region is not judged to have directionality. On the contrary, as the density value becomes lower, the width between $E_{max}$ and $0.4 * E_{max}$ becomes narrower and the relation $E_{min}<0.4 * E_{max}$ tends to be satisfied. More frequently, therefore, the region is judged to have directionality.

[Embodiment 5]

Figure 11:
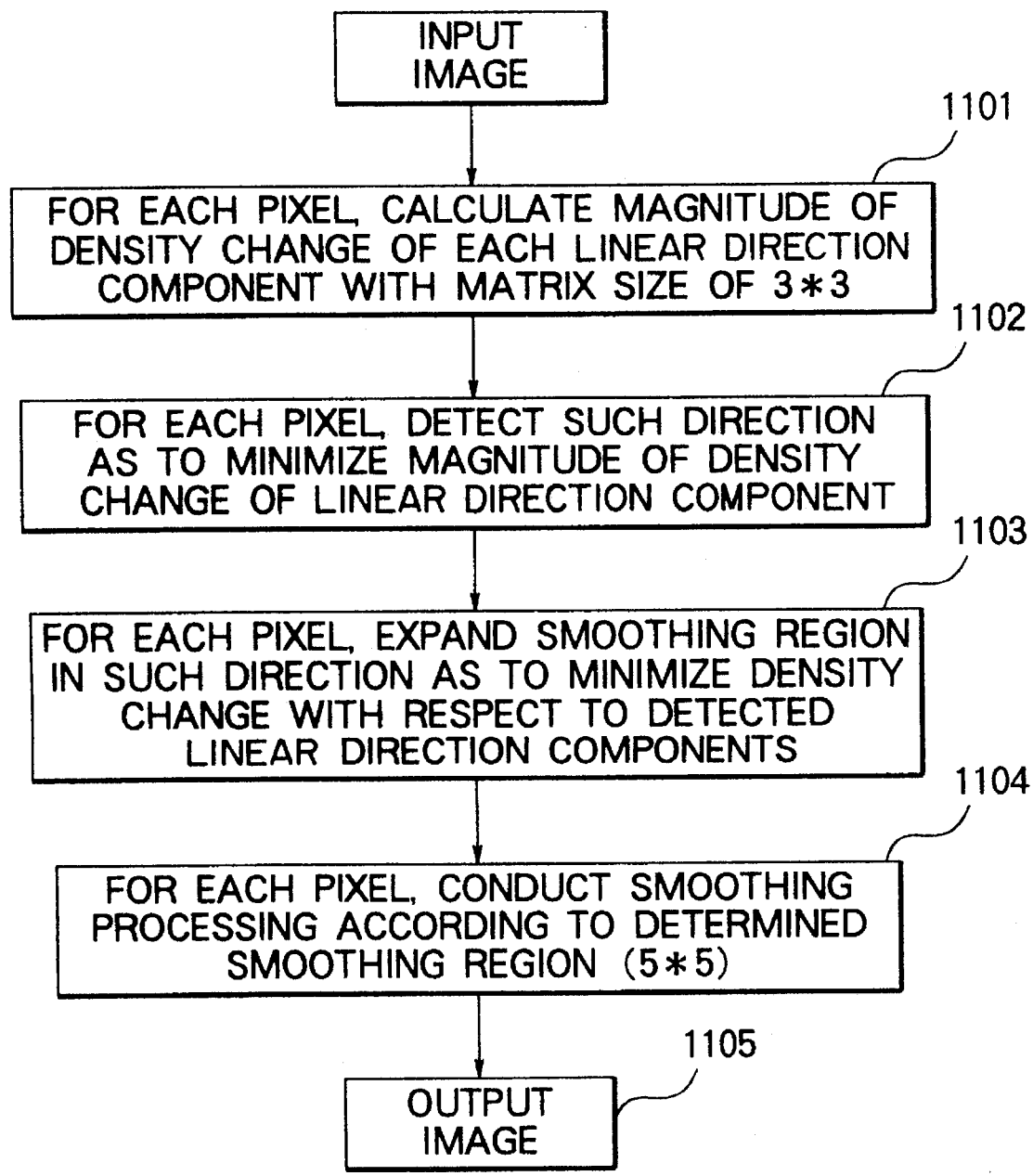
FIG. 11 is a flow chart showing the processing procedure of still another embodiment of the present invention.
Figure 12:
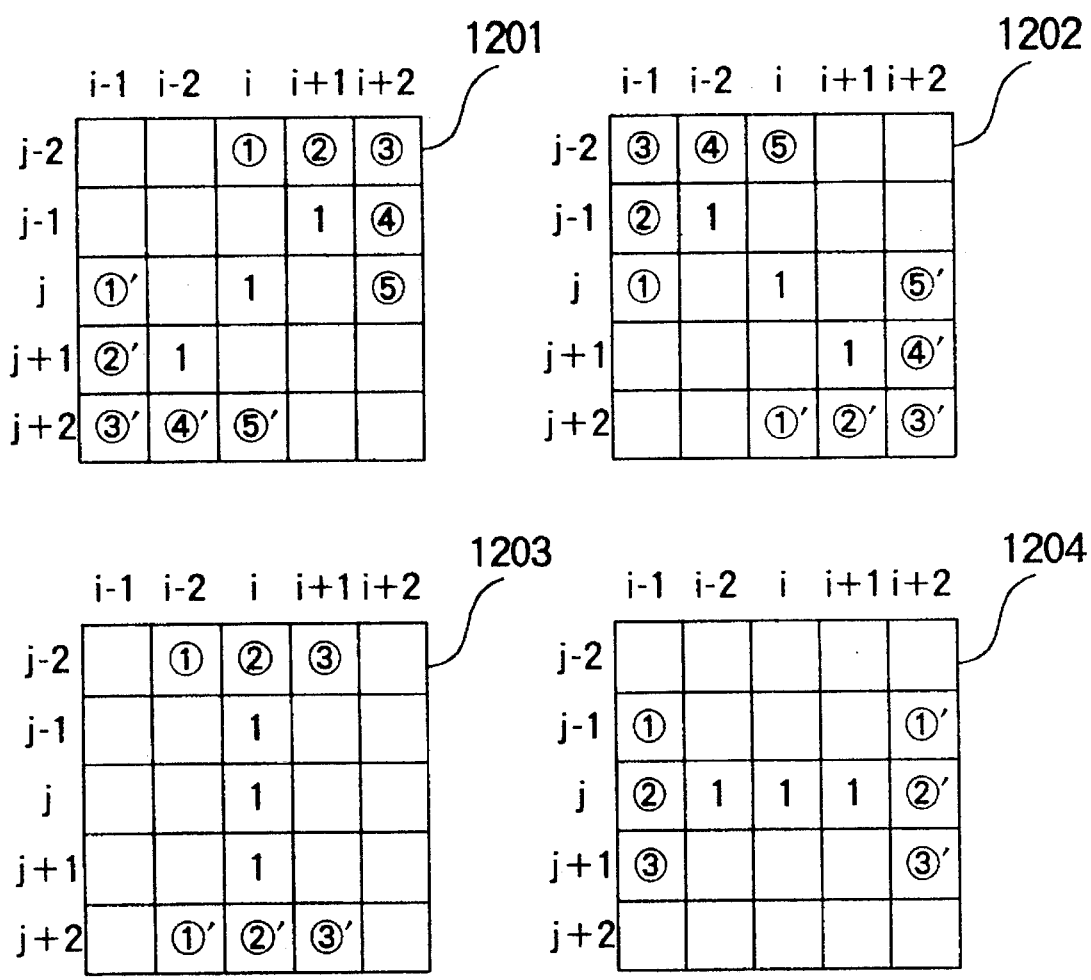
FIG. 12 is a diagram showing patterns for expanding a matrix size of 3*3 to 5*5 in the embodiment of FIG. 11.

A fifth embodiment will now be described by referring to FIGS. 11 and 12. In the first embodiment, the direction of the local structure is detected in a 3*3 matrix and smoothing processing is conducted. In the present embodiment, such a direction as to minimize the density change is first detected in a 3*3 matrix for each pixel. Thereafter, in pixels located at both ends of the detected direction of the 3*3 matrix, such a direction as to minimize the density change is derived again and the smoothing region is expanded to 5*5, in order to enhance the smoothing effect while preventing blurring of the structure. With reference to FIG. 12, conformity of templates of equidensity lines of four kinds is judged in the 3*3 matrix. A template indicated by coefficients 1 in 1201, 1202, 1203 or 1204 is selected as an optimum template. Out of pixels which are adjacent to one end of the selected template and which are represented by circled numerals, such a pixel as to minimize the density change is selected and the smoothing area is expanded thereto. Also out of pixels which are adjacent to the other end of the selected template and which are represented by circled numerals with a prime symbol, such a pixel as to minimize the density change is selected and the smoothing area is expanded thereto as well. In case the direction of a local structure is detected by using a matrix of 5*5 in the embodiment 1, a nonnegligible structure may be picked in a pixel located at an end of the detected direction even in such a direction as to minimize the density change and the image may be blurred by conducting smoothing processing in this direction. In the present embodiment, however, linearity of a local structure is detected in a 3*3 matrix region and thereafter the smoothing region is expanded in such a direction that smoothing exerts the least influence, and hence such a problem is mitigated. Hereafter, the entire procedure of filtering processing of the present embodiment will be described by referring to FIG. 11.

[Step 1101] For each pixel (i, j) of the input image I, the magnitude d4(k) (k=1 to 4) of density change of the linear direction component is calculated with the matrix size of 3*3.

[Step 1102] For each pixel (i, j), such a direction as to minimize the magnitude d4(k) (k=1 to 4) of density change of the linear direction component is derived.

[Step 1103] According to the direction detected at step 1102, the template 1201, 1202, 1203 or 1204 is selected as described below. Then the absolute value d1(k) of density difference in the direction toward each adjacent pixel denoted by a circled numeral and the absolute value d2(k) of density difference in the direction toward each adjacent pixel denoted by a circled numeral with a prime symbol are calculated. And the smoothing region is expanded in such a direction as to minimize the absolute values d1(k) and d2(k) of a density difference. That is to say, the following processing is conducted.

When the detected direction is 1201, the following equations are calculated.

① $d1(1)=|I(i+1,j-1)-I(i,j-2)|$

①' $d2(1)=|I(i-1,j+1)-I(i-2,j)|$

② $d1(2)=|I(i+1,j-1)-I(i+1,j-2)|$

②' $d2(2)=|I(i-1,j+1)-I(i-2,j+1)|$

③ $d1(3)=|I(i+1,j-1)-I(i+2,j-2)|$

③' $d1(3)=|I(i-1,j+1)-I(i-2,j+2)|$

④ $d1(4)=|I(i+1,j-1)-I(i+2,j-2)|$

④' $d1(4)=|I(i-1,j+1)-I(i-1,j+2)|$

⑤ $d1(5)=|I(i+1,j-1)-I(i+2,j)|$

⑤' $d1(5)=|I(i-1,j+1)-I(i,j+2)|$ \hfill (4)

As pixels used for smoothing, an adjacent pixel corresponding to a minimum value of d1(k) (k=1 to 5) and an adjacent pixel corresponding to a minimum value of d1(k) (k=1 to 5) are added.

When the detected direction is 1202, the following equations are calculated and similar processing is conducted.

① $d1(1)=|I(i-1,j-1)-I(i,j-2)|$,

①' $d2(1)=|I(i+1,j+1)-I(i,j+2)|$,

② $d1(2)=|I(i-1,j-1)-I(i-1,j-2)|$,

②' $d2(2)=|I(i+1,j+1)-I(i+1,j+2)|$,

③ $d1(3)=|I(i-1,j-1)-I(i-2,j-2)|$,

③' $d2(3)=|I(i+1,j+1)-I(i+2,j+2)|$,

④ $d1(4)=|I(i-1,j-1)-I(i-1,j-2)|$,

④' $d2(4)=|I(i+1,j+1)-I(i+2,j+1)|$,

⑤ $d1(5)=|I(i-1,j-1)-I(i-2,j)|$,

⑤' $d2(5)=|I(i+1,j+1)-I(i+2,j)|$ \hfill (5)

When the detected direction is 1203, the following equations are calculated and similar processing is conducted.

① $d1(1)=|I(i-1,j)-I(i-2,j-1)|$,

①' $d2(1)=|I(i+1,j+1)-I(i+2,j-1)|$,

② $d1(2)=|I(i-1,j)-I(i-2,j)|$,

②' $d2(2)=|I(i+1,j+1)-I(i+2,j)|$,

③ $d1(3)=|I(i-1,j)-I(i-2,j+1)|$

③' $d2(3)=|I(i+1,j+1)-I(i+2,j+2)|$ \hfill (6)

When the detected direction is 1204, the following equations are calculated and similar processing is conducted.

① $d1(1)=|I(i,j-1)-I(i-1,j-2)|$,

①' $d2(1)=|I(i,j+1)-I(i-2,j+2)|$,

② $d1(2)=|I(i,j-1)-I(j-2)|$,

②'$d2(2)=|I(i,j+1)-I(i,j+2)|$,

③ $d1(3)=|I(ij-1)-I(i+1,j-2)|$,

③' $d2(3)=|I(,j+1)-I(i+1,j+2)|$ \hfill (7)

[Step 1104] For each pixel (i, j), a five-point simple average 0(i, j) is calculated according to the smoothing region determined at step 1103.

[Step 1105] The filter-processed image, O is outputted.

By carrying out the procedure heretofore described for each pixel of the input image, the filter processing is completed.

[Embodiment 6]

Figure 13:
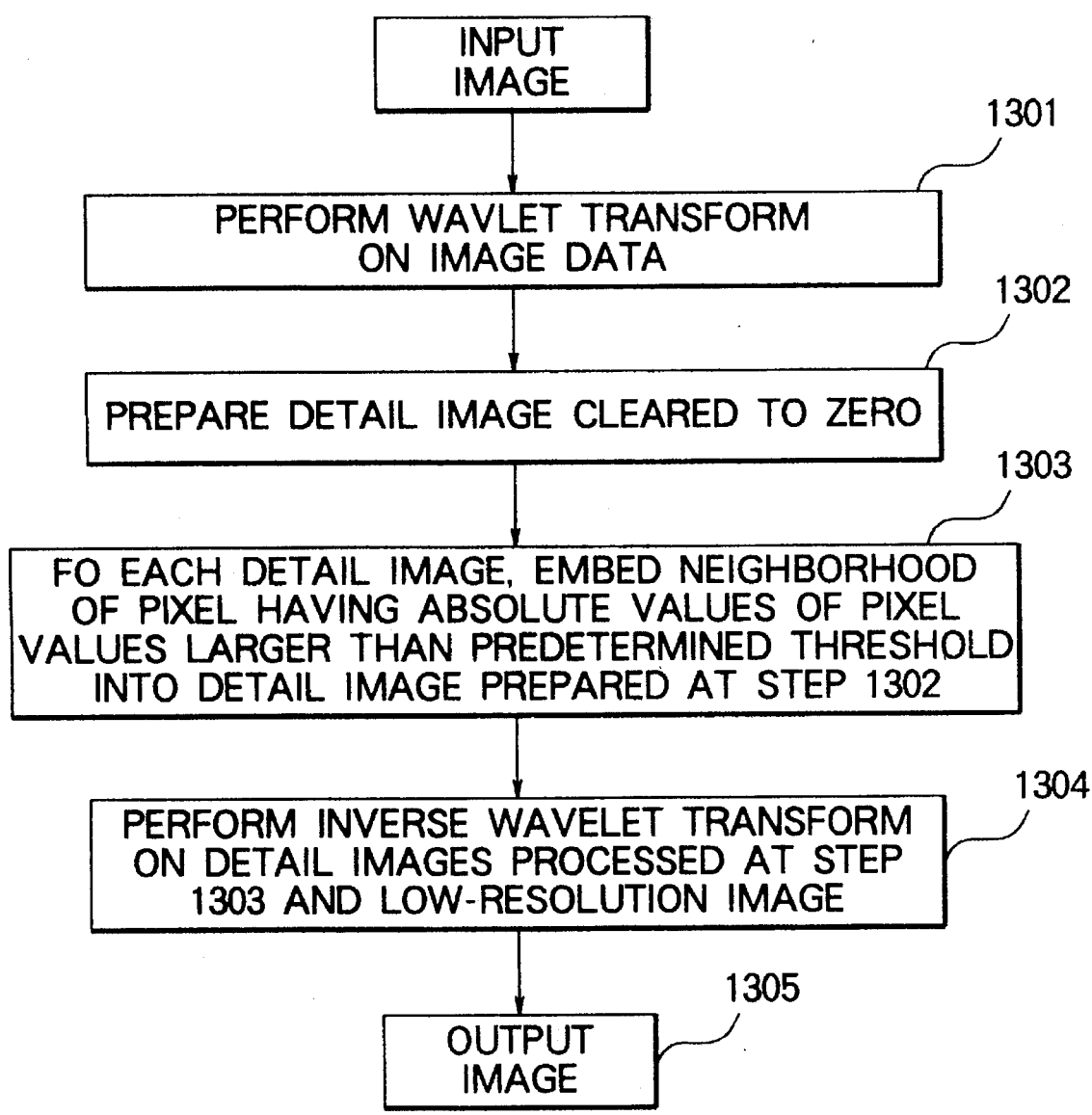
FIG. 13 is a flow chart showing the processing procedure of a further embodiment of the present invention.
Figure 14:
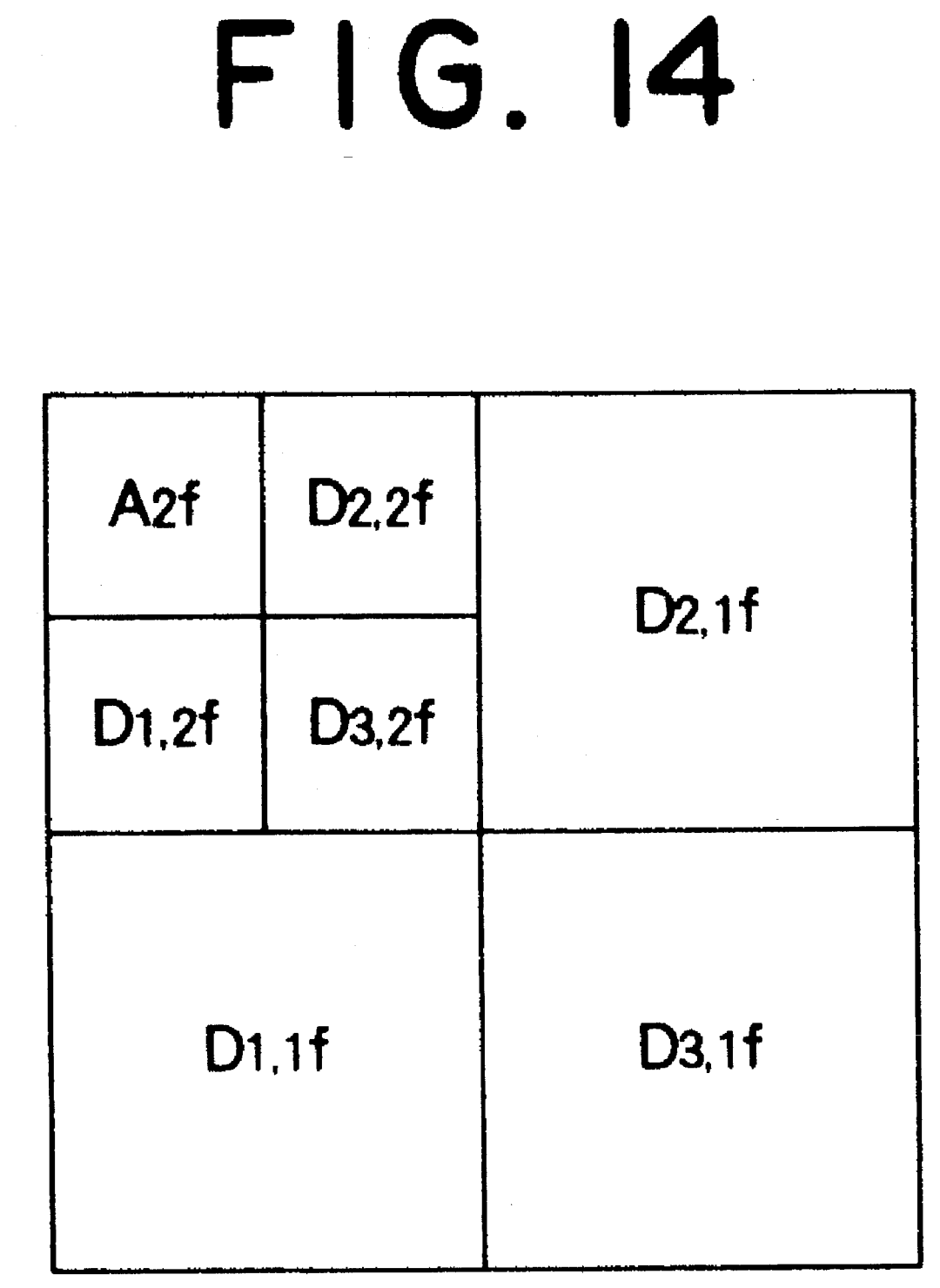

The present embodiment will now be described by referring to FIGS. 13 and 14. In the present embodiment, wavelet transform is utilized for analysis of directionality of a local structure. Wavelet transform is a technique for analyzing data by using a base function including shift transform and scale transform of a function localized on a real space. Because of localization of that base function, wavelet transform is excellent in analysis of an unexpected data change. In the present embodiment, subband coding described in S. G. Mallat, IEEE Trans. on PAMI, vol. 11, no. 7, 1989, pp. 674–693 is utilized as a wavelet transform of two-dimensional image data. According to subband coding, an image is separated into three detail images representing longitudinal, lateral and oblique structure components of the image and a low-resolution image while degrading the resolution of the image to half. As a high-pass filer and a low-pass filter to be used there, a four-tap regular filter described in I. Daubechies, Commun. Pure Appl. Math., vol. 41, November 1988, pp. 909–996 Daubechies is used. FIG. 14 is a diagram showing wavelet representation using subband coding. Since $D_{2,i}f$ is coupled to a high-pass filter in the longitudinal direction and it is coupled to a low-pass filter in the lateral direction, a lateral structure of the image reduced to half in resolution appears. In the same way, since $D_{1,i}f$ is coupled to a high-pass filter in the lateral direction and it is coupled to a low-pass filter in the longitudinal direction, a longitudinal structure of the image reduced to half in resolution appears. Finally, since $D_{3,i}f$ is coupled to a high-pass filter in the lateral direction and it is coupled to a high-pass filter in the longitudinal direction, an oblique structure of the image reduced to half in resolution appears. By utilizing the property of a this detailed image, an analysis of directional component of a local structure is made.

The procedure of filtering of the present embodiment will now be described by referring to FIG. 13.

[Step 1301] The image data I is subjected to wavelet transform and decomposed into detail images $D_{3,i}I$, $D_{2,i}I$ and $D_{1,i}I$ and flow-resolution image $A_{1,i}I$.

[Step 1302] For every pixel (i, j ) $D'_{3,i}I$ (i, j)=0, $D'_{2,i}I(i, j)$=0 and $D'_{1,i}I(i, j)$=0.

[Step 1303] For each pixel (i, j), the following equations are calculated with respect to predetermined threshold values $T_{3,i}$, $T_{2,i}$ and $T_{1,i}$.

when $|D_{3,i}I(i,j)| > T_{3,i}$, (8)

$D'_{3,i}I(i+k, j+1) = D_{3,i}I(i+k, j+1)$ $(k, 1 = -3 \sim 3)$ when $|D_{2,i}I(i,j)| > T_{2,i}$, (9)

$D'_{2,i}I(i+k, j+1) = D_{2,i}I(i+k, j+1)$ $(k, 1 = -3 \sim 3)$ when $|D_{1,i}I(i,j)| > T_{1,i}$, (10)

$D'_{1,i}I(i+k, j+1) = D_{1,i}I(i+k, j+1)$ $(k, 1 = -3 \sim 3)$

[Step 1304] An image reproduced by inverse wavelet transform on the basis of $D'_{3,i}I$, $D'_{2,i}I$ and $D'_{1,i}I$ processed at step 1303 and $A_{1,i}I$ is decided to be 0.

[Step 1305] As a filter-processed signal, 0 is outputted.

As heretofore described, the present invention makes it possible to reduce noise at high speed for an image having a low signal-to-noise ratio while holding down edge blurring and density unevenness to the minimum. Especially, boundary lines of edges are emphasized and made clear.

We claim:

1. A noise filtering method implemented using a computer for enhancing images, said method comprising the steps of:

calculating a magnitude $E_i$ of density change for each of a plurality of linear direction components i in a local region around each pixel of an input image; and conducting one-dimensional smoothing processing for each pixel of the input image in a linear direction of one of said plurality of linear direction components, said linear direction for each pixel being selected on a basis of having a minimum said magnitude $E_i$ of density change for that pixel as calculated in said calculating step.

2. A noise filtering method according to claim 1, wherein a sum of absolute values of density differences between adjacent pixels located on a line of each linear direction component i is calculated and adopted as the magnitude $E_i$ of density change.

3. A noise filtering method according to claim 1, wherein the magnitude $E_i$ of density change is derived from a pixel value included in a 3*3 matrix.

4. A noise filtering method according to claim 3, wherein said plurality of linear direction components i are linear direction components of four directions (i=1 to 4) forming an angle of 45 degrees with each other.

5. A noise reducing filter according to claim 1, wherein the magnitude $E_i$ of density change is derived from a pixel value included in a 5*5 matrix.

6. A noise filtering method according to claim 5, wherein said plurality of linear direction components i are linear direction components of eight directions (i=1 to 8) forming an angle with each other.

7. A noise filtering method according to claim 1, further comprising the step of determining a matrix size for smoothing, smoothing processing being conducted by using densities of a plurality of pixels along said linear direction of the input image in the determined matrix size for smoothing.

8. A noise filtering method according to claim 7, wherein with respect to a minimum value $E_{min}$ of the magnitude $E_i$ of density change calculated for each linear direction component i, a matrix size for smoothing is made larger as $E_{min}$ becomes smaller.

9. A noise filtering method implemented using a computer for enhancing images, said method comprising the steps of:

calculating a magnitude $E_i$ of density change for each of a plurality of linear direction components i in a local region around each pixel of an input image;

detecting a minimum value $E_{min}$ of magnitude of density change for said each pixel, determining, on the basis of said minimum value $E_{min}$, whether two-dimensional smoothing should be preformed or one-dimensional smoothing should be performed, and detecting such a direction as to minimize $E_i$ as a direction for smoothing in case one-dimensional smoothing is to be performed; and performing plane smoothing processing in case the determined smoothing method is two-dimensional smoothing mid performing one-dimensional smoothing processing in the detected direction in case the determined smoothing method is one-dimensional smoothing.

10. A noise filtering method according to claim 9, wherein when said minimum value $E_{min}$ of the magnitude $E_i$ of density change is equal to or less than a predetermined threshold value, two-dimensional smoothing is performed with respect to the pixel.

11. A noise filtering method implemented using a computer for enhancing images, said method comprising the steps of:

calculating a magnitude $E_i$ of density change for each of a plurality of linear direction components i in a local region around each pixel of an input image;

detecting such a direction as to minimize said magnitude $E_i$ of density change;

expanding a smoothing region in the direction minimizing the magnitude $E_i$ of density change, from an end of said local region in said detected direction toward an outside of said local region; and conducting smoothing processing in the expanded region for each pixel.

12. A noise filtering method implemented using a computer for enhancing images, said method comprising the steps of:

successively determining, for each pixel of an input image, whether directionality of a local structure is present in each matrix size while monotonically decreasing the matrix size, and deciding a maximum matrix size in which directionality of the local structure can be judged to be present;

detecting, for said each pixel, a direction of linear direction component as to minimize the magnitude $E_i$ of density change in the decided matrix size; and conducting smoothing processing in the direction detected according to the matrix size decided for each pixel.

13. A noise filtering method according to claim 12, wherein it is determined whether directionality of a local structure is present in each of matrix sizes 5*5, 3*3 and 1*1.

14. A noise reducing filter according to claim 12, wherein it is determined whether directionality of a local structure is present in each of matrix sizes 3*3 and 1*1.

15. A noise filtering method according to claim 12, comprising the steps of:

calculating the magnitude $E_i$ of density change of each linear direction component (i=1 to m) in a region of matrix size n*n for said each pixel;

deriving a maximum value $E_{max}$ and a minimum value $E_{min}$ of the magnitude $E_i$ (i=1 to m) of density change for each pixel;

judging, for each pixel, directionality to be present in a local structure in a region having a matrix size of n*n of the pixel, when the value of $D=E_{max}-E_{min}$ is larger than a predetermined threshold value T; and judging, for each pixel, directionality to be not present in a local structure in a region having a matrix size of n*n of the pixel, when the value of $D=E_{max}-E_{min}$ is smaller than the predetermined threshold value T.

16. A noise filtering method according to claim 12, comprising the steps of:

calculating the magnitude $E_i$ of density change of each linear direction component (i=1 to m) in a region of matrix size n*n for said each pixel;

deriving a maximum value $E_{max}$ and a minimum value $E_{min}$ of the magnitude $E_i$ (i=1 to m) of density change for each pixel;

judging, for each pixel, directionality to be present in a local structure in a region having a matrix size of n*n of the pixel, when the relation $E_{min}<p * E_{max}$ is satisfied for a predetermined threshold value p (0<p≦1); and judging, for each pixel, directionality to be not present in a local structure in a region having a matrix size of n*n of the pixel, when the relation $E_{min} \geq p * E_{max}$ is satisfied.

17. A noise filtering method according to claim 12, comprising the steps of:

calculating the magnitude $E_i$ of density change of each linear direction component (i=1 to m) in a region of matrix size n*n for said each pixel;

deriving a minimum value $E_{min}$ of the magnitude $E_i$ (i=1 to m) of density change for each pixel;

judging directionality to be present in a local structure in a region having a matrix size of n*n of the pixel, when the relation $E_{min}<T$ is satisfied for a predetermined threshold value T; and judging directionality to be not present in a local structure in a region having a matrix size of n*n of the pixel, when the relation $E_{min} \geq T$ is satisfied.

18. A noise filtering method implemented using a computer for enhancing images, said method comprising the steps of:

calculating a magnitude $E_i$ of density change for each of a plurality of linear direction components i in a local region around each pixel of an input image;

detecting a minimum value $E_{min}$ of magnitude of density change for said each pixel, determining, on the basis of said minimum value $E_{min}$, whether two-dimensional smoothing should be preformed or one-dimensional smoothing should be performed, and detecting a linear direction of one of said plurality of linear direction components for smoothing in case one-dimensional smoothing is to be performed, said linear direction being detected on a basis of having a minimum said magnitude $E_i$ of density change as calculated in said calculating step; and performing plane smoothing processing in case the determined smoothing method is two-dimensional smoothing and performing one-dimensional smoothing processing in the detected direction in case the determined smoothing method is one-dimensional smoothing.

19. A noise filtering method implemented using a computer for enhancing images, said method comprising the steps of:

calculating a magnitude $E_i$ of density change for each of a plurality of linear direction components i in a local region around each pixel of an input image;

detecting a linear direction of one of said plurality of linear direction components so as to minimize said magnitude $E_i$ of density change as calculated in said calculating step;

expanding a smoothing region in said linear direction minimizing the magnitude $E_i$ of density change from said detecting step, from an end of said local region in said linear direction toward an outside of said local region; and conducting one-dimensional smoothing processing in the expanded region for each pixel.

20. A noise filtering method implemented using a computer for enhancing images, said method comprising the steps of:

successively determining, for each pixel of an input image, whether directionality of a local structure is present in each matrix size while monotonically decreasing the matrix size, and deciding a maximum matrix size in which directionality of the local structure can be judged to be present;

detecting, for said each pixel, a linear direction of one of a plurality of linear direction components i in a local region around each pixel, said linear direction being detected on a basis of having a minimum magnitude $E_i$ of density change of all said plurality of linear direction components in a decided matrix size from said determining step; and conducting one-dimensional smoothing processing in said linear direction detected according to the matrix size decided for each pixel.

* * * * *